US012768738B2

(12) United States Patent
May

(10) Patent No.: US 12,768,738 B2
(45) Date of Patent: Oct. 20, 2026

(54) MASS SPECTROMETER FOR DETECTING LEAKAGES VIA A TRACER GAS

(71) Applicant: ATEQ, Les Clayes-sous-Bois (FR)

(72) Inventor: Thierry May, Les Clayes-sous-bois (FR)

(73) Assignee: ATEQ, Les Clayes-sous-bois (FR)

( * ) Notice: Subject to any disclaimer, the term of this patent is extended or adjusted under 35 U.S.C. 154(b) by 325 days.

(21) Appl. No.: 18/283,689

(22) PCT Filed: Mar. 14, 2022

(86) PCT No.: PCT/EP2022/056452
§ 371 (c)(1),
(2) Date: Sep. 22, 2023

(87) PCT Pub. No.: WO2022/200090
PCT Pub. Date: Sep. 29, 2022

(65) Prior Publication Data
US 2024/0183740 A1 Jun. 6, 2024

(30) Foreign Application Priority Data
Mar. 24, 2021 (FR) ........................................ 2102968

(51) Int. Cl.
*G01M 3/20* (2006.01)

(52) U.S. Cl.
CPC ............ *G01M 3/205* (2013.01); *G01M 3/202* (2013.01)

(58) Field of Classification Search
CPC ........ G01M 3/202; G01M 3/203; G01M 3/26; G01M 3/20; G01M 3/205
See application file for complete search history.

(56) References Cited

U.S. PATENT DOCUMENTS

| | | | | | |
|---|---|---|---|---|---|
| 3,155,826 | A * | 11/1964 | Peters | H01J 49/14 | 250/299 |
| 3,742,228 | A * | 6/1973 | Gutow, Jr. | H01J 49/20 | 250/282 |
| 4,472,631 | A * | 9/1984 | Enke | H01J 49/28 | 250/281 |
| 4,761,553 | A * | 8/1988 | Juravic, Jr. | G01M 3/205 | 250/298 |

(Continued)

FOREIGN PATENT DOCUMENTS

| | | | | |
|---|---|---|---|---|
| FR | 3115951 | A1 * | 11/2020 | G05F 1/575 |
| WO | WO 2005098900 | A2 * | 3/2005 | H01J 49/30 |
| WO | WO 2022144621 | A1 * | 12/2020 | G01R 33/0029 |

*Primary Examiner* — Wyatt A Stoffa
*Assistant Examiner* — Mica Jillian Einhorn
(74) *Attorney, Agent, or Firm* — Dierker & Kavanaugh, P.C.

(57) ABSTRACT

The present invention relates to a mass spectrometer (10) for detecting leakages via a tracer gas, said spectrometer (10) comprising: —an ionising means (3) intended to ionise said tracer gas; —at least one magnetic-field source (501) that generates a magnetic field (I) that is dependent on the electric current I supplied to said source (501) and that is intended to sort ionised elements; —a means (7) for detecting said tracer gas once ionised; characterized in that said spectrometer comprises a means (II) for adjusting the magnetic field, said adjusting means being configured to allow at least two separate adjustments, said adjustments having different sensitivities.

8 Claims, 2 Drawing Sheets

(56) References Cited

U.S. PATENT DOCUMENTS

| | | | | | |
|---|---|---|---|---|---|
| 5,157,352 | A * | 10/1992 | Chickanosky, Jr. | H03F 1/30 | 330/289 |
| 7,151,255 | B2 * | 12/2006 | Weiss | F24F 11/62 | 250/290 |
| 10,948,456 | B1 * | 3/2021 | Brucker | G01M 3/202 | 250/281 |

* cited by examiner

Figure 1:
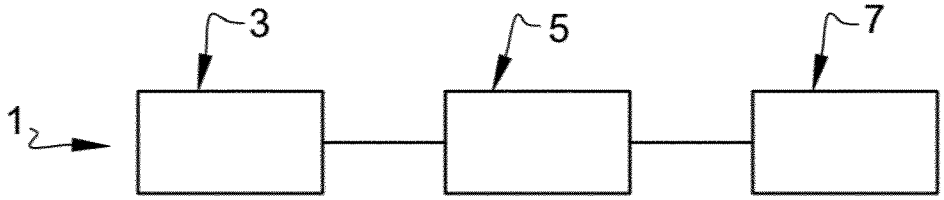

[Fig. 1]

Figure 2:
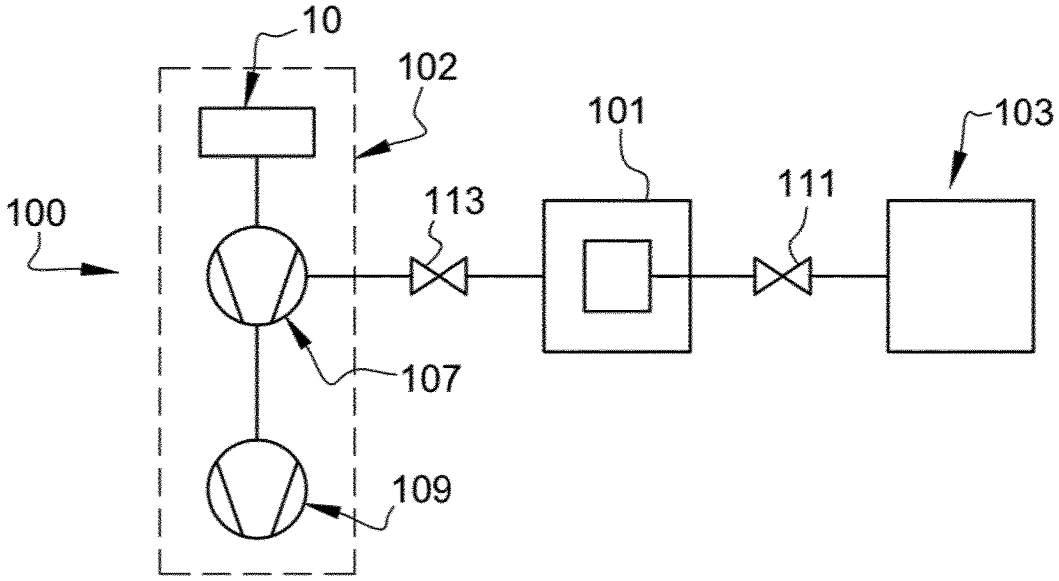

[Fig. 2]

[Fig. 3]
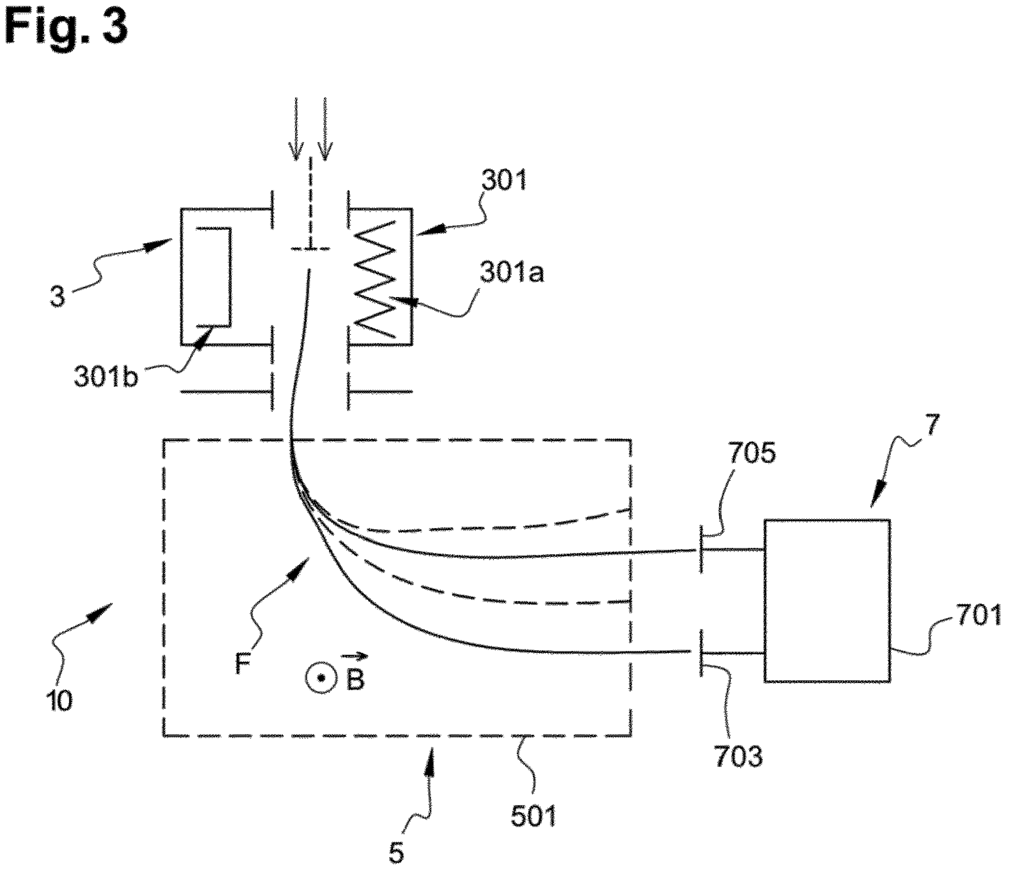
[Fig. 4]
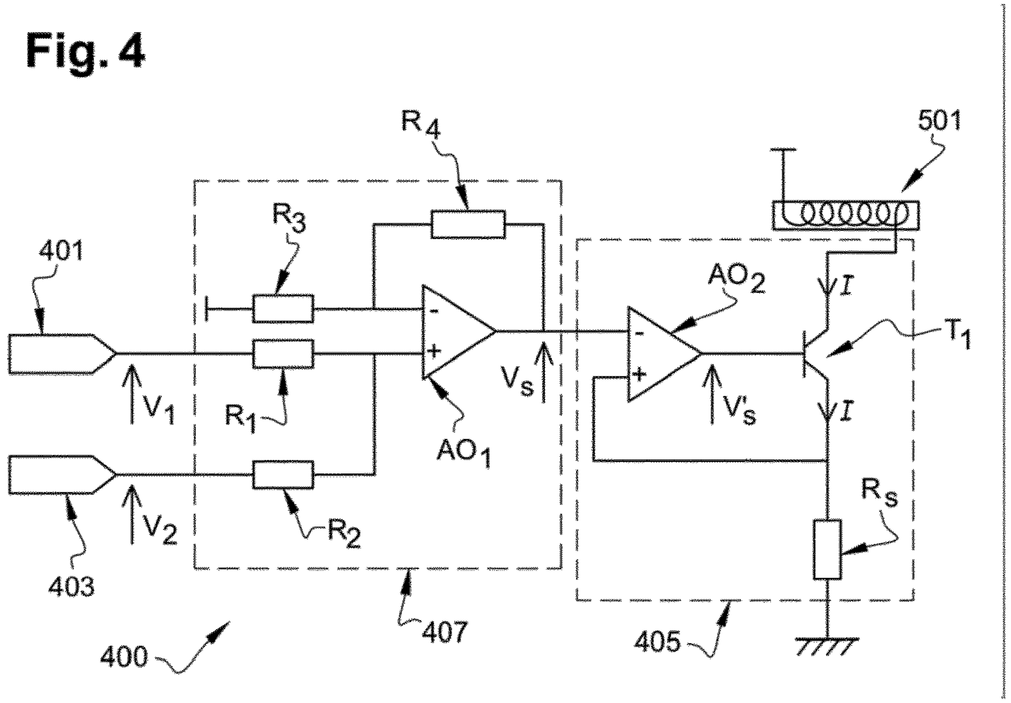

MASS SPECTROMETER FOR DETECTING LEAKAGES VIA A TRACER GAS

The present invention relates to the field of mass spectrometers, and more particularly to detecting leakages by tracer-gas mass spectrometry.

As a reminder, a mass spectrometer is a device that uses the movement of the ions in electrical and/or magnetic fields, in order to classify them according to their mass/charge ratios. As illustrated in FIG. 1, a mass spectrometer 1 generally comprises an ionisation means 3, an analyser 5 and a detection means 7.

The ionisation means 3 is configured to ionise the chemical element or elements to be analysed. This ionisation also generates ions that will then be sorted and selected according to their mass/charge ratios.

This sorting can be obtained in various ways, but the concern is here, more particularly, with the analyses that proceed at least with a selection by dispersion of the ions by means of a magnetic field.

The ions thus sorted are next sent to the detection means 7, such as a detector that converts the stream of ions received into an electric current. Said electric current output from the detector subsequently undergoes a processing of the signal making it possible to obtain more precise measurements relating to the ions.

This type of mass spectrometer can in particular be used for detecting leakages or monitoring the gastightness of objects, for example by measuring and quantifying a tracer gas, such as helium or dihydrogen. However, other types of tracer gas can be used, such as dioxygen, carbon dioxide, etc.

However, the mass spectrometers used for detecting a leakage are intended to be used in industrial environments in which numerous environmental factors may disturb the measurements or settings, in particular variations in temperature, shocks, vibrations, movements, maintenance of the equipment, etc.

Moreover, a mass spectrometer for detecting leakages must also be as multipurpose as possible, in particular by operating with various tracer gases, for example to adapt to the tracer gases available and/or to the leakage levels sought.

The present invention thus makes it possible to remedy one or more of the problems mentioned above, by proposing a mass spectrometer for detecting leakages by tracer gas, said spectrometer comprising:

- an ionisation means intended to ionise said tracer gas;
- at least one magnetic field source generating a magnetic field $\vec{B}$ dependent on the electric current I supplying said source intended for sorting the ionised elements;
- a means for detecting said ionised tracer gas.

According to the invention, said spectrometer comprises a means for adjusting the magnetic field $\vec{B}$ generated by said source, said adjustment means being configured to allow at least two distinct adjustments, said adjustments having different sensitivity.

According to a possible feature, said adjustment means comprises a pre-adjustment (or rough adjustment) and a fine adjustment.

According to another possible feature, one of the adjustments makes it possible to establish a nominal magnetic field $\vec{B_0}$, while the other adjustment makes it possible to generate a variation in magnetic field $\Delta\vec{B}$ around the nominal value of the magnetic field $\vec{B_0}$.

The electromagnetic field $\vec{B}$ generated by the magnetic field source is therefore in this case the sum of the nominal magnetic field $\vec{B_0}$ and the magnetic field variation $\Delta\vec{B}$.

According to another possible feature, said magnetic field source comprises an electromagnet.

It should be noted that the magnetic field source may also be a magnetic sector incorporating one or more electromagnets.

According to another possible feature, said adjustment means comprises at least two adjustment commands, a combinatorial circuit configured to combine values of said at least two adjustment commands, and a circuit for controlling the current I circulating in said magnetic field source. It is to be understood that the term, "command(s)," as used herein, may mean "control(s)."

According to another possible feature, said at least two adjustment commands are electrical quantities, such as voltages.

According to another possible feature, the magnetic field $\vec{B}$ depends on the values of the electrical quantities of said at least two adjustment commands.

According to another possible feature, the mass spectrometer comprises N adjustment commands and/or N magnetic field sources, where N is an integer greater than or equal to 3.

The multiplicity of the adjustment commands and/or of the magnetic field sources makes it possible to address a greater number of tracer gases and to facilitate the adjustments of said mass spectrometer according to the invention.

According to another possible feature, the combinatorial circuit comprises:

- a plurality of resistors $R_1$, $R_2$, $R_3$ and $R_4$;
- an operational amplifier $AO_1$ associated with said resistors $R_1$, $R_2$, $R_3$ and $R_4$ to form a non-inverting summing circuit.

According to another possible feature, the control circuit comprises an operational amplifier $AO_2$ associated with a grounding resistor $R_S$ and with a transistor T1, the assembly forming a circuit of the voltage to current converter type.

The present invention also relates to a system for detecting leakages via tracer gas, characterised in that it comprises a mass spectrometer as defined above.

The invention will be better understood, and other aims, details, features and advantages thereof will appear more clearly throughout the following description of a particular embodiment of the invention, given only for illustrative and non-limitative purposes, with reference to the appended drawings, wherein:

FIG. 1, referenced, is a highly schematic representation of a mass spectrometer and of the main functional parts thereof;

FIG. 2, referenced, is a highly schematic representation of an example of a circuit for monitoring the gastightness of an object by means of a tracer gas and of a mass spectrometer according to the invention;

FIG. 3, referenced, is an enlarged schematic representation of the mass spectrometer of FIG. 2;

FIG. 4, referenced, is a schematic representation of a means for adjusting a magnetic field source of the mass spectrometer of FIG. 2.

FIG. 2 is a highly schematic representation of an example of a leakage detection system 100 via tracer gas comprising a mass spectrometer 10 according to the invention. It should be noted that the mass spectrometer 10 comprises the same functional parts as the mass spectrometer 1 of FIG. 1, and thus the identical or similar elements will bear the same references and will not be detailed again.

Said system 100 thus comprises:

a test chamber 101 configured to accommodate an object the gas tightness of which is to be tested;

a leakage detection device 102 that is connected to the test chamber 101 and comprises the mass spectrometer 10, a main vacuum pump 107 and an auxiliary vacuum pump 109;

a gas source 103 connected to the object and configured to fill said object with a tracer gas, such as hydrogen or helium.

The main vacuum pump 107, such as a turbomolecular pump, has an inlet connected to the test chamber 101, but is also connected to the mass spectrometer 10. The auxiliary vacuum pump 109 is, for its part, connected to the outlet of the main vacuum pump 107.

Said system 100 also comprises a plurality of valves 111 and 113:

a first valve 111 disposed on the pipe connecting the gas source 103 to the object being tested, which for its part is disposed in the test chamber 101, said valve 111 making it possible to adjust the quantity of tracer gas injected into the object being tested;

a second valve 113 disposed on the pipe connecting the test chamber 101 to the main vacuum pump 107.

The main pump 107 generates a high vacuum by means of which the tracer gas, which is input into the test chamber 101 by a leakage of the object tested, is sucked. Subsequently, inside the main pump 107, the tracer gas then flows mainly in the direction of the auxiliary pump 109, but some of the tracer gas moves into the mass spectrometer 10 in order to be analysed therein.

The main vacuum pump 107 is for example a turbomolecular pump, a diffusion pump or any other type of molecular pump making it possible to achieve vacuum levels compatible with detecting leakages of the order of at least $10^{-3}$ mbar·L/sec.

As illustrated in FIG. 3, the mass spectrometer 10 thus comprises an ionisation means 3, comprising for example an ion source 301 with a cathode 301*a* and an anode 301*b*. The ion source 301 is surrounded by a screen in which an opening (or diaphragm) is formed, enabling a beam of ions F to emerge towards an analyser 5.

The analyser 5 is, for its part, configured to select the relevant ions, the sorting taking place in particular by means of a magnetic field $\vec{B}$. This is because the analyser 5 comprises in particular a magnetic-field source 501 configured to generate a magnetic field $\vec{B}$ orthogonal to the plane of the path of the ions (i.e. orthogonal to the plane of FIG. 3, able to curve the path of the ions).

The magnetic-field source 501 is more particularly a source the magnetic field of which depends on the electric current that "supplies" said source.

Thus the magnetic-field source 501 is for example an electromagnet, i.e. a ferromagnetic material on which a winding is disposed, the magnetic field generated being dependent on the electric current circulating in said winding (in particular the direction of circulation and the intensity thereof). It should be noted that said source 501 could also be a magnetic sector for example.

Thus, in the presence of a magnetic field $\vec{B}$, the beam of ions F is diverted. This is because a uniform magnetic field $\vec{B}$ perpendicular to the plane of the path of the ions, because of the Lorentz force, will give said ions a curved path (the point of impact of the ion, and therefore the deviation thereof, making it possible to know the mass thereof from the charge).

The beam of ions F diverted by the magnetic field $\vec{B}$ is then oriented towards one or more diaphragms after which a detection means 7 is disposed.

Said detection means 7 comprises for example one or more sensors 703 and/or 705 and an electronic circuit 701 connected to said sensors 703 and 705 to process the electrical signal coming from them.

It should be noted that the mass spectrometer 10 may also include the following elements (not shown), electrostatic lens or lenses for coupling, focusing, collecting, etc., accelerator plates, etc. These elements can be disposed at the ionisation source 3, the analyser 5 or the detection means 7, or between said means 3, 5 and 7.

Thus, when the magnetic field $\vec{B_0}$ in the analyser 5 is adjusted so as to exactly address tracer gases having a determined mass M at the middle of at least one diaphragm (serving as a selection slot), the other gases having the same electrical charge, but having masses different from M, will, in the analyser 4, turn on different radii. The gases with a mass lower than M will turn on a smaller radius, while the gases with a mass greater than M will turn on a larger radius than the one associated with the gas of mass M.

To allow adjustment of the magnetic field $\vec{B}$, the mass spectrometer 10 comprises a means 400 for adjusting the magnetic field generated by said source 501, for example by the electromagnet. This means is illustrated more particularly in FIG. 4.

As illustrated on this FIG. 4, said adjustment means 400 is connected to the coil of the electromagnet 501 and is configured to vary the intensity of the current I circulating in said coil.

The adjustment means 400 thus comprises two distinct adjustment commands 401 and 403, a circuit 405 for controlling the current of said electromagnet 501, and a combinatorial circuit 407 for said commands 401 and 403. Said combinatorial circuit 407 is configured to receive said commands 401 and 403 as an input and thus to generate as an output a function F dependent on the values of said commands 401 and 403.

The resulting function F is thus sent to the control circuit 405 so that there is adjustment of the current I according to the values of said commands 401 and 403.

Said commands 401 and 403 are for example digital to analogue converters that deliver, as an input of the combinatorial circuit 407, respectively voltages $V_1$ and $V_2$. It should be noted however that any electrical quantity could be adapted, by means of suitable arrangements.

Said combinatorial circuit 407, for its part, comprises in particular:

a plurality of resistors $R_1$, $R_2$, $R_3$ and $R_4$;

an operational amplifier $AO_1$ associated with said resistors $R_1$, $R_2$, $R_3$ and $R_4$ to form a non-inverting summing circuit.

Thus, said combinatorial circuit 407 will have at its output a voltage $V_5$ dependent on the input voltage values $V_1$ and $V_2$, and resistors $R_1$, $R_2$, $R_3$ and $R_4$, of the type:

$$F(V_1, V_2) = V_S = \frac{R_4 + R_3}{R_3} \frac{R_2 V_1 + R_1 V_2}{R_1 + R_2}$$

By judiciously choosing the value of said resistors $R_1$, $R_2$, $R_3$ and $R_4$, for example by taking $R_1=R_3=R_4=R$ et $R_2=kR$ with k a constant greater than 1, and preferably very much greater than 1, the function F is simplified to give:

$$F(V_1, V_2) = V_S = 2\left(V_1 + \frac{V_2}{k}\right)$$

The two commands $V_1$ and $V_2$ will thus have a different weighting and will therefore influence the value of the output voltage $V_5$ distinctly. It should be noted that the influence of the voltage $V_2$ is K times less than the influence of the voltage $V_1$ on the output voltage $V_5$.

Said control circuit 405 for its part comprises an operational amplifier $AO_2$ associated with a grounding resistor $R_S$ and with a transistor T1, the assembly forming a circuit of the voltage to current (or transconductance) converter type. The transistor $T_1$ is for example a bipolar transistor (or of the MOSFET type) the base (or gate) of which is connected to the output of the operational amplifier $AO_2$, the collector (or source) of which is connected to the electromagnet 501, and the emitter (or drain) of which is connected to the resistor $R_S$.

The output voltage $V_5$ coming from the combinatorial circuit 407 is sent to the inverting input of the operational amplifier $AO_2$, while the non-inverting input is connected to the grounding resistor $R_S$ and to the emitter of the transistor $T_1$ (more particularly connected to a node located between the emitter of the transistor T1 and the grounding resistor $R_S$).

The output voltage V's coming from the operational amplifier $AO_2$ thus adjusts the value of the current I circulating through the transistor $T_1$, but also through the electromagnet 501. The current I depends on the voltages $V_1$ and $V_2$ of the commands 401 and 403 in accordance with the following formula:

$$I = \frac{2}{R_S}\left(V_1 + \frac{V_2}{k}\right)$$

The magnetic field $\vec{B}$ is thus dependent (more particularly proportional for an electromagnet) on the intensity of the current I circulating in the coil of the electromagnet 501, and consequently the field $\vec{B}$ is here dependent on the commands 401 and 403.

It can also be defined that the current I circulating in the electromagnet 501 in the following manner:

$$I=I_0+\Delta I$$

where $I_0$ is a nominal current, dependent on the voltage $V_1$, which generates a nominal magnetic field $\vec{B_0}$, and where $\Delta I$ is a small variation in current around the nominal current $I_0$, dependent on $V_2$, which generates a variation $\Delta\vec{B}$ in the magnetic field around the value of the nominal magnetic field $\vec{B_0}$.

Thus, one of the adjustment commands 401 makes it possible to establish a nominal magnetic field $\vec{B_0}$, while the other adjustment command makes it possible to generate a variation in magnetic field $\Delta\vec{B}$ around the value of the nominal magnetic field $\vec{B_0}$.

It can also be defined that said adjustment means 400 comprises an adjustment command 401 equivalent to a preadjustment (or rough adjustment), while the adjustment command 403 is a fine adjustment.

The invention claimed is:

1. A mass spectrometer for detecting leakages via a tracer gas, said spectrometer comprising:

an ionisation means intended to ionise said tracer gas;

at least one magnetic field source generating a magnetic field $\vec{B}$ dependent on an electric current I supplying said source intended for sorting the ionised elements;

a means for detecting said ionised tracer gas;

characterised in that said spectrometer comprises a means for adjusting the magnetic field $\vec{B}$ generated by said source, said adjustment means being configured to allow at least two distinct adjustments, said adjustments having different sensitivities, wherein said adjustment means comprises at least two adjustment commands, a combinatorial circuit configured to combine values of said at least two adjustment commands, and a circuit for controlling the current I circulating in said magnetic field source, wherein the combinatorial circuit comprises:

a plurality of resistors $R_1$, $R_2$, $R_3$ and $R_4$; and an operational amplifier $AO_1$ associated with said plurality of resistors $R_1$, $R_2$, $R_3$ and $R_4$ to form a non-inverting summing circuit, wherein the circuit for controlling the current I comprises an operational amplifier $AO_2$ associated with a grounding resistor ($R_S$) and with a transistor ($T_1$) to form a voltage to current converter circuit, wherein the respective values of each resistor of the plurality of resistors $R_1$, $R_2$, $R_3$ and $R_4$, are such that $R_1=R_3=R_4=R$, and $R_2=kR$, and wherein k is a constant greater than 1.

2. The mass spectrometer according to claim 1, wherein said adjustment means comprises a pre-adjustment and a fine adjustment.

3. The mass spectrometer according to claim 1, wherein one of the adjustments makes it possible to establish a nominal magnetic field $\vec{B_0}$, while the other adjustment makes it possible to generate a variation in magnetic field $\Delta\vec{B}$ around the value of the nominal magnetic field $\vec{B_0}$.

4. The mass spectrometer according to claim 1, wherein said magnetic-field source comprises an electromagnet.

5. The mass spectrometer according to claim 1, wherein said at least two adjustment commands are electrical quantities $V_1$ and $V_2$, such as voltages.

6. The mass spectrometer according to claim 5, wherein the magnetic field $\vec{B}$ depends on the values of the electrical quantities $V_1$ and $V_2$ of said at least two adjustment commands.

7. The mass spectrometer according to claim 1, further comprising N adjustment commands and/or N magnetic field sources, where N is an integer greater than or equal to 3.

8. A system for detecting leakages via tracer gas, comprising the mass spectrometer according to claim 1.

* * * * *